C. STRAND.
FISHING TOOL.
APPLICATION FILED NOV. 20, 1920.
1,418,212.
Patented May 30, 1922.
2 SHEETS—SHEET 1.
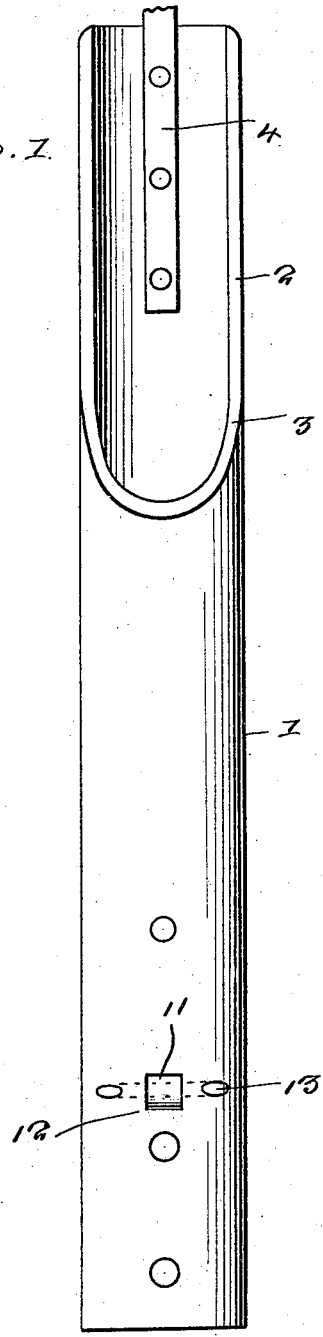
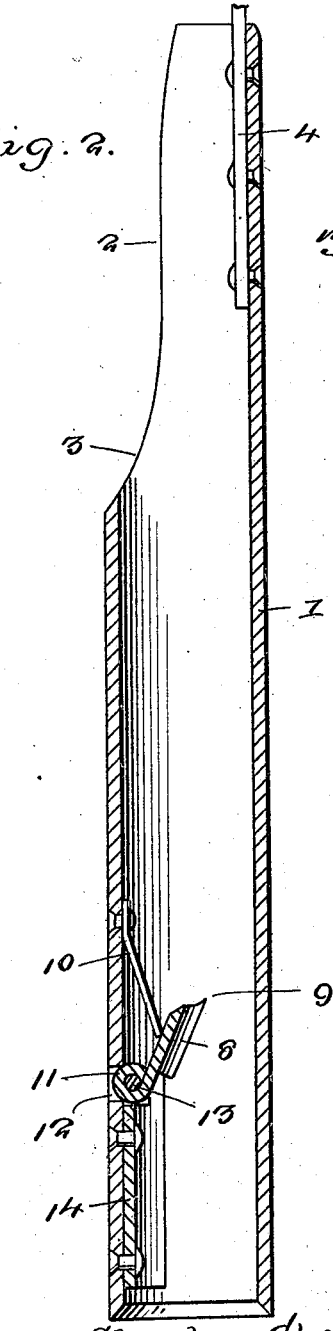
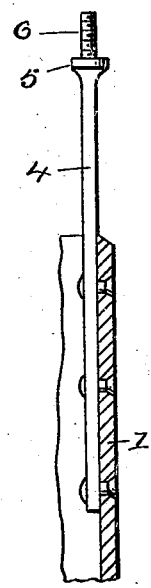

C. STRAND.
FISHING TOOL.
APPLICATION FILED NOV. 20, 1920.
1,418,212.
Patented May 30, 1922.
2 SHEETS—SHEET 2.
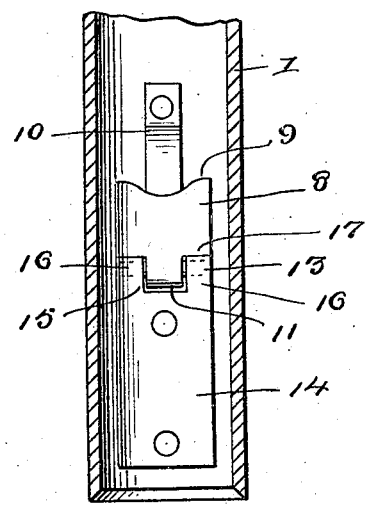
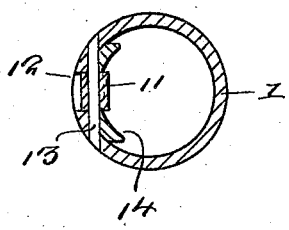
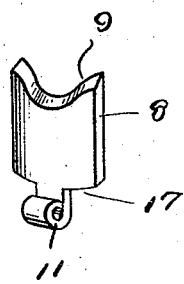
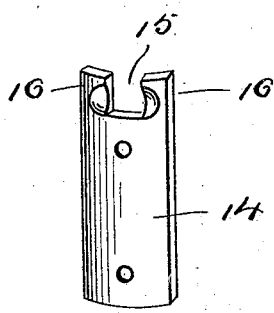
Charles Strand
INVENTOR
BY Victor J. Evans
ATTORNEY
WITNESS:
E. R. Ruppert.

UNITED STATES PATENT OFFICE.

CHARLES STRAND, OF BURKBURNETT, TEXAS.

FISHING TOOL.

1,418,212.  Specification of Letters Patent.  Patented May 30, 1922.

Application filed November 20, 1920. Serial No. 425,447.

*To all whom it may concern:*

Be it known that I, CHARLES STRAND, a citizen of the United States, residing at Burkburnett, in the county of Wichita and State of Texas, have invented new and useful Improvements in Fishing Tools, of which the following is a specification.

My present invention has reference to a tool for fishing broken rods and tubing that is used in deep oil wells.

My object is the production of a tool for this purpose which shall be extremely simple in construction and thoroughly efficient in operation.

A further object is the production of a fishing tool that includes a tubular member or socket partly opened at one of the sides from adjacent the upper end thereof, the said upper end having attached thereto a shank whereby the tool is connected with the operaing means, the tubular socket having therein a spring influenced jaw designed to engage with a broken rod or tubing to be withdrawn from the well casing, said jaw being susceptible to movement against the rod or tubing to permit of the passage of the latter in the socket, and thereafter the said jaw is sprung to engaging position, means being provided in the socket for supporting the jaw in engaging position to relieve the same from excessive strain, while the open portion of the socket permits of the device being passed over the upper section of a broken rod or tubing to engage with the lower section thereof, and consequently remove both of the sections.

The foregoing, and other objects which will appear as the nature of the invention is better understood, may be accomplished by a construction, combination and operative arrangement of parts, such as is disclosed by the drawings which accompany and which form part of this application.

In the drawings:—

Figure 1 is an elevation of a fishing tool constructed in accordance with this invention.

Figure 2 is a sectional view approximately on the line 2—2 of Figure 1.

Figure 3 is a sectional view through the lower end of the socket portion of the tool, and taken at right angles to the disclosure in Figure 2.

Figure 4 is a sectional view on the line 4—4 of Figure 1.

Figure 5 is a perspective view of the gripping jaw.

Figure 6 is a perspective view of the supporting or reinforcing plate for the jaw.

Fig. 7 is a detail partly in section of the connecting stem and its support.

My improved fishing tool comprises a body portion which is in the nature of a pipe section, and which, for convenience, I will hereinafter refer to as the socket. The socket is designated by the numeral 1, and has one of its sides, from its upper end cut away to provide an elongated opening which communicates with the bore of the said socket. The side walls provided by the cut-away portion, indicated by the numeral 2, are preferably slightly inclined from the rounded connecting wall 3 therefor, to the upper end of the socket. Centrally, and at the open portion of the socket there is bolted, riveted, or otherwise secured a stem 4. This stem has its outer end shouldered, as at 5 and provided with a reduced threaded extension 6 to which the lifting rod is attached.

In the socket, on the side thereof provided with the opening, but at a distance from the lower end of the said socket there is arranged a jaw 8. The jaw has its engaging end brought to a point or in other words, sharpened, and the engaging end of the said jaw is concaved from the corners to the center thereof, as indicated by the numeral 9. Preferably, the jaw is round in cross section, that is of a concavo-convex shape, so that the said jaw can snugly hug the side of the socket when forced thereagainst. The jaw, however, is normally swung outward toward the axial center of the socket by a spring 10 which is secured in the bore. The jaw has its lower end formed with an offset ear 11 that is received in an opening 12 in the wall of the socket. Passing through a transverse opening in the ear, and through aligning openings in the socket to the opposite sides of the opening that receives the ear, is a pivot pin 13 for the jaw.

Below the jaw, I rivet or otherwise secure a plate 14 which is concavo-convex in cross section and which has its upper end centrally slotted, as at 15 to receive the projecting ear portion of the jaw. The arms 16 arranged to the opposite sides of the slot 15 have their inner faces concaved and through these concavities the pivot pin 13 for the jaw passes. The pin bearing against these surfaces is held thereby in contact with the inner wall of the tubular body and is consequently materially re-enforced. The outer end of these arms are designed to engage with the lower edge 17 of the jaw, that is the edge of the jaw to the opposite sides of the lug, the lug projecting a slight but suitable distance beyond the said edge 17. Thus, when the jaw is brought to active position and engages with a broken rod or tube, which has been received through the socket 1, the said jaw is materially reinforced by the plate so that the strain of the rod engaged thereby will be partly directed to the bracing or supporting plate 14, and by this arrangement, comparatively great lengths of rods can be fished. By providing the socket with the opening at the upper end thereof, the tool may be caused to pass over the upper section of a broken rod or tube and on to the lower section thereof, an upward movement of the tool permitting the jaw to assume an angular position with respect to the socket and a gripping engagement with the rod or tube.

What I claim is:—

A fishing tool comprising a tubular body, a plate of concavo-convex shape in cross section secured in the tubular body adjacent to the lower end thereof, arms formed by the upper end of said plate being bifurcated, said arms having their inner surfaces concaved, a jaw of a concavo-convex shape in cross section having one end sharpened and its opposite end provided with an offset ear disposed between the arms of the aforementioned plate, a pivot passing through said tubular body, concaved surfaces of said arms, and said jaw respectively, and a spring secured within the tubular body engaging the jaw to swing the same to active position.

In testimony whereof I affix my signature.

CHARLES STRAND.